US011223562B1

(12) United States Patent
Guo et al.

(10) Patent No.: US 11,223,562 B1
(45) Date of Patent: Jan. 11, 2022

(54) SELECTIVELY PROCESSING PACKETS BASED ON THEIR CLASSIFICATION BY A COUNTING BLOOM FILTER AS A FIRST PACKET OR A SUBSEQUENT PACKET OF A TRANSPORT PROTOCOL CONNECTION

(71) Applicant: Fortinet, Inc., Sunnyvale, CA (US)

(72) Inventors: Zhi Guo, San Jose, CA (US); Xu Zhou, San Jose, CA (US); Kan Xiao, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/990,797

(22) Filed: Aug. 11, 2020

(51) Int. Cl.
*H04L 12/743* (2013.01)
*H04L 12/911* (2013.01)
*H04L 29/06* (2006.01)
*H04L 12/24* (2006.01)
*H04L 12/823* (2013.01)

(52) U.S. Cl.
CPC ...... *H04L 45/7453* (2013.01); *H04L 41/0893* (2013.01); *H04L 47/32* (2013.01); *H04L 47/726* (2013.01); *H04L 63/1458* (2013.01); *H04L 69/166* (2013.01)

(58) Field of Classification Search
CPC .... H04L 41/0893; H04L 47/32; H04L 47/726
See application file for complete search history.

(56) References Cited

U.S. PATENT DOCUMENTS

| 10,901,907 | B2* | 1/2021 | Bhimani | H04L 9/3239 |
| 2007/0237079 | A1* | 10/2007 | Whitehead | H04L 43/00 370/235 |
| 2018/0375773 | A1* | 12/2018 | Gobriel | H04L 61/2046 |

OTHER PUBLICATIONS

Fan, Li et al., "Summary Cache: A Scalable Wide-Area Web Cache Sharing Protocol", IEEE/ACM Transactions on Networking, vol. 8, No. 3, Jun. 2000, pp. 281-293.
Bloom, Burton H., "Space/Time Trade-offs in Hash Coding with Allowable Errors", Communications of the ACM, vol. 13, No. 7, Jul. 1970, pp. 422-426.

(Continued)

*Primary Examiner* — Zhensheng Zhang
(74) *Attorney, Agent, or Firm* — HDC Intellectual Property Law, LLP

(57) ABSTRACT

Systems and methods for selectively processing packets based on their classification by a CBF are provided. According to one embodiment, a network device receives a packet, extracts n-tuple values from the header of the packet that are indicative of a particular transport protocol connection with which the packet is associated, determines whether the particular transport protocol connection represents an active transport protocol connection represented within the CBF by searching the CBF based on the n-tuple values. When the packet is a first packet of a new connection, counters maintained by the CBF corresponding to the n-tuple values are incremented. When a decrement event is detected for one or more of the counters, they are decremented. Finally, the packet is processed in accordance with its classification as a first packet of a new connection or a subsequent packet of an existing connection.

20 Claims, 13 Drawing Sheets

(56) References Cited

OTHER PUBLICATIONS

Tomáš Halagan, Tomáš Kováčik, Peter Trúchly, Andrej Binder. Syn Flood Attack Detection and Type Distinguishing Mechanism Based on Counting Bloom Filter. 3rd International Conference on Information and Communication Technology-EurAsia (ICT-EURASIA) and 9th International Conference on Research and Practical Issues of Enterprise Information Systems (CONFENIS), Oct. 2015, Daejon, South Korea, pp. 30-39, ff10.1007/978-3-319-24315-3_4ff. ffhal-01466237.

Antikainen, Markku et al., "Denial-of-Service Attacks in Bloom-Filter-Based Forwarding", EEE/ACM Transactions on Networking, vol. 22, No. 5, Oct. 2014, pp. 1463-1476.

Patgiri, Ripon et al., "Preventing DDoS using Bloom Filter: A Survey", EAI Endorsed Transactions on Scalable Information Systems, vol. 5, Issue 19, e3, published Nov. 7, 2018, 9 pages.

Shuai C, Lei J, Gong Z, Ouyang X (2018), "Suitability of a new Bloom filter for numerical vectors with high dimensions", PLoS ONE 13(12): e0209159. https://doi.org/10.1371/journal.pone.0209159.

\* cited by examiner

SELECTIVELY PROCESSING PACKETS BASED ON THEIR CLASSIFICATION BY A COUNTING BLOOM FILTER AS A FIRST PACKET OR A SUBSEQUENT PACKET OF A TRANSPORT PROTOCOL CONNECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

BACKGROUND

Field

Embodiments of the present invention generally relate to network security and network packet processing. In particular, embodiments of the present invention relate to selective processing of packets based on their respective classification by a counting Bloom filter (CBF) as a first packet or a subsequent packet of a transport protocol connection to facilitate efficient processing of the packets by a network device.

Description of the Related Art

Network devices perform connection-rate based measurement and filtering of packets to, among other things, detect and manage potential security threats posed by inbound Internet Protocol (IP) traffic. For example, connection-rate filtering may be used to protect network infrastructure by slowing or stopping IP traffic. One task associated with connection-rate based filtering is to determine whether a packet is the first packet of a connection or a subsequent packet of the connection. A session table is commonly used for this purpose in which each session table entry includes the n-tuple (e.g. the source IP address, the destination IP address, the layer four protocol, the source port, the destination port, etc.) of a connection.

The use of session tables has various drawbacks, for example, relating to the usage of memory and computational resources as well as the latency of performing a session table entry insertion.

SUMMARY

Systems and methods are described for selectively processing packets based on their classification by a counting Bloom filter (CBF) as a first packet or a subsequent packet of a transport protocol connection. According to one embodiment, a processing resource of a network device receives a packet, extracts n-tuple values from the header of the packet that are indicative of a particular transport protocol connection with which the packet is associated, determines whether the particular transport protocol connection represents an active transport protocol connection represented within a CBF by searching the CBF based on the n-tuple values. The network device classifies the packet as a subsequent packet of the active transport protocol connection when the determining is affirmative, and classifies the packet as the first packet of a new transport protocol connection when the determination is negative. In an embodiment, the CBF includes multiple counters and the processing resource increments value of those counters of the multiple counters corresponding to the n-tuple values based on said determination and decrements the one or more counters when a decrement event is detected for one or more counters of the multiple counters. The processing resource processes the packet in accordance with its classification as the first packet or the subsequent packet.

In an embodiment, the processing resource searches the CBF by calculating k hash values by applying k hash functions to the n-tuple values, reading k memory locations corresponding to the k hash values, wherein each of the k memory locations contains one of the multiple counters, and evaluating whether all k memory locations contain non-zero values. When the search result of the CBF is affirmative, the packet is classified as the subsequent packet and when the search results of the CBF is negative, the packet is classified as the first packet.

For processing the packet further, the network device makes a determination regarding whether the subsequent packet is part of a denial of service (DoS) attack, and drops the subsequent packet if its determined to be part of the denial of server attack. The denial of service attack may include a Transmission Control Protocol (TCP) SYN flood or a port scan attack. The packet is processed based on the determination of whether the packet is a first packet or a subsequent packet and also based on the determination of the packet to be part of a DoS attack. In an embodiment, the processing resource of the network device may also consider load status a host device where the packet the going to processed next while processing the packet.

In an embodiment, the processing resource of the network device maintains multiple connection rate meters per one or more of destination Internet Protocol (IP) address, source IP address, and security policy. The processing resource adds a queue entry containing information indicative of those counters of the multiple counters corresponding to the n-tuple values to a retirement queue when the determination is negative. In an embodiment, the decrement event includes the retirement queue reaching a depth threshold or a timestamp of a top queue entry of the retirement queue meeting a time threshold.

Embodiments of the present disclosure may be used to classify packets of any layer four protocol and are not restricted to TCP packets. In an embodiment, the network device classifies a fragmented IP packet into a sequence group of multiple sequence groups where the packet includes a fragmented IP packet. The network device selectively sends the lead fragment to a host or drops the lead fragment when the fragmented IP packet is a lead fragment of the sequence group. The network device selectively sends the follow-on fragment to the host or drops the follow-on fragment based on whether the lead fragment of the sequence group was sent to the host when the fragmented IP packet is a follow-on fragment of the sequence group. In an embodiment, the network device selectively sends the fragmented packet to the host based on a policy associated with the n-tuple values. In an embodiment, the network device selectively sends the fragmented packet to the host based on a current processing load of the host.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
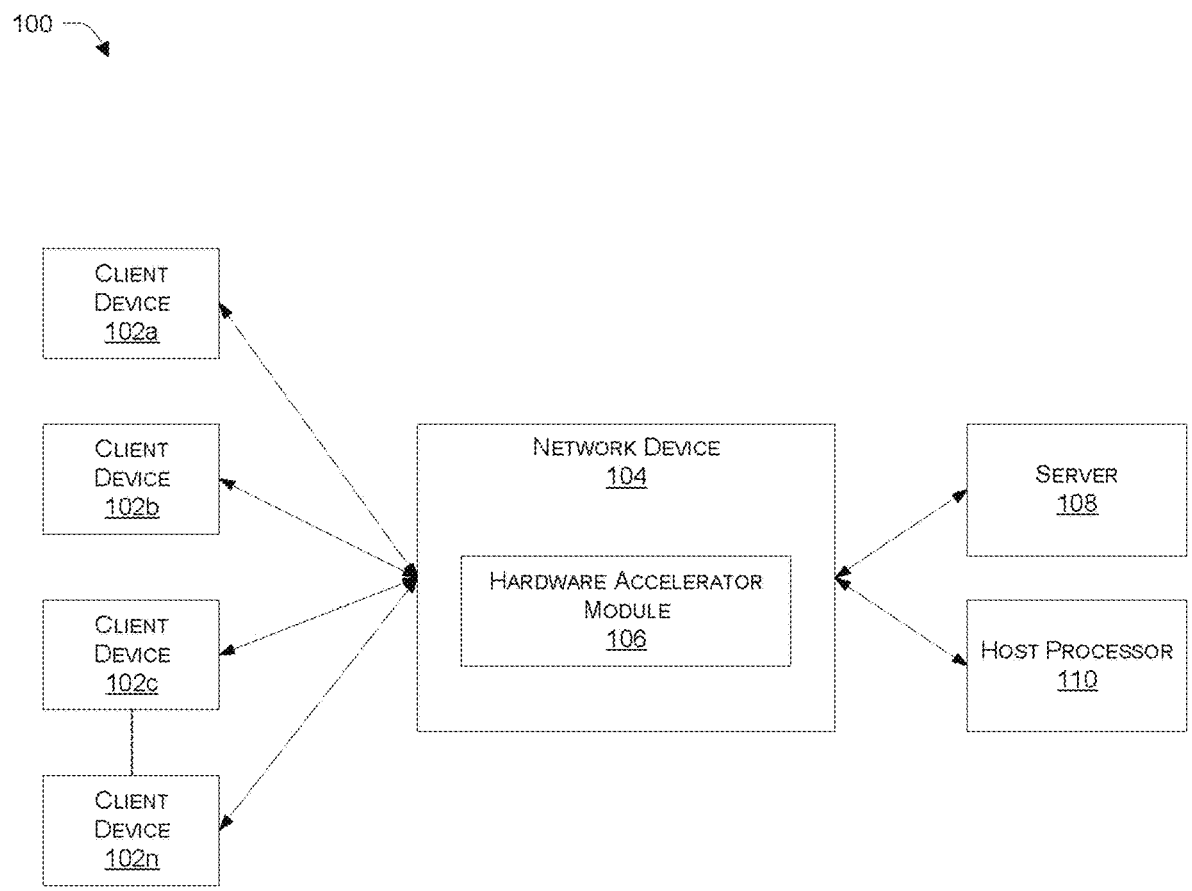
FIG. 1 conceptually illustrates an enterprise network in which network packet processing is performed in accordance with an embodiment of the present disclosure.

Systems and methods are described for processing packets based on their classification by a CBF as a first packet or a subsequent packet of a transport protocol connection. In an embodiment, a processor on a network device receives an incoming packet, extracts n-tuple values (e.g. source IP address, source port, destination IP address, IP address, protocol) of the incoming packet, searches information associated with the n-tuple values using a CBF, classifies the incoming packet as a first packet or a subsequent packet of a transport protocol connection based on a result of the CBF and processes the incoming packet based on whether the incoming packet is the first packet or the subsequent packet. In an embodiment, the CBF receives the n-tuple value of the incoming packet, hashes the n-tuple values to calculate k hash values, reads k memory locations corresponding to the k hash values, and determines whether the value at each of the k memory locations is non-zero. The incoming packet is classified as the first packet if the value at any of the k memory locations is zero and the incoming packet is classified as the subsequent packet if the value at each of the k memory locations is non-zero. The processor updates those of multiple connection rate meters associated with respective n-tuple values when the respective match is found.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present invention may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within the single computer) and storage systems containing or having network access to a computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled", and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network security appliance" or a "network security device" generally refers to a device or appliance in virtual or physical form that is operable to perform one or more security functions. Some network security devices may be implemented as general-purpose computers or servers with appropriate software operable to perform the one or more security functions. Other network security devices may also include custom hardware (e.g., one or more custom Application Specific Integrated Circuits (ASICs)). A network security device is typically associated with a particular network (e.g., a private enterprise network) on behalf of which it provides the one or more security functions. The network security device may reside within the particular network that it is protecting or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), and DoS attack detection appliances (e.g., the FORTIDDOS family of DoS attack detection and mitigation appliances).

As used herein a "network resource" generally refers to various forms of data, information, services, applications, and/or hardware devices that may be accessed via a network (e.g., the Internet). Non-limiting examples of network resources include web applications, cloud-based services, network devices, and/or associated applications (e.g., user interface applications), and network security devices and/or associated applications (e.g., user interface applications). Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

The term "n-tuple" is used herein to describe a set of n elements (e.g., source and/or destination IP address, port, and protocol) present, for example, in the header of a packet that can be used to identify a transport protocol connection with which the packet is associated.

As used herein a "transport protocol" generally refers to a Layer 4 (Transport Layer) protocol of the Open Systems Interconnection (OSI) model. Non-limiting examples of transport protocols include Transmission Control Protocol (TCP) and User Datagram Protocol (UDP).

FIG. 1 conceptually illustrates an enterprise network 100 in which network packet processing is performed in accordance with an embodiment of the present disclosure. In an enterprise network 100, a network device 104, (e.g., a switch, a router or a network security device) may receive packets from any of client devices 102*a-n*, which may be collectively referred to herein as client devices 102 and individually referred to herein as client device 102, and perform one or more security operations. The network device 104 may be configured to receive a packet and classify the received packet using a CBF as a first packet of a new connection (e.g., a new transport protocol connection) or as a subsequent packet of an existing connection (e.g., an existing transport protocol connection). Based on the classification of the packet as being the first packet or the subsequent packet, the network device 104 may determine whether the packet should be dropped or forwarded to server 108 or host processor 110 of another network security device or of the network device 104. The network device 104 may have one or more processors (including host processor 110) configured to perform different operations with respect to packet classification, packet processing, and other security operations.

In an embodiment, the network device 104 may include a special-purpose processor (e.g. network processor), a general-purpose processor, and a hardware acceleration module 106. For better efficiency and faster processing at network device 104, different operations can be distributed across the various processing resources, involve multiple of the various processing resources and/or make use of a hardware accelerator. Depending on the nature of the task to be performed, the network device 104 may perform load balancing of tasks by distributing tasks among the existing processing resources of the network device 104. In an embodiment, the network device 104 may use a CBF to determine whether a packet is a subsequent packet of an established connection or first packet of a new connection. The CBF's memory content is updated (e.g., the connection-rate meters are incremented) when a determination is made that the packet is the first packet. In one embodiment, the connection-rate meters maintained by the CBF are gradually purged as no search requests are received relating to the connection-rate meters for a certain period of time.

The hardware acceleration module 106 may provide hardware acceleration to the network device 104 to increase the efficiency of packet processing. The network device 104 may maintain connection rate meters with respect to different header information of a transport protocol packet. Network device 104 may update the connection rate meters based on the determination regarding whether the packet is a first packet or subsequent packet. In an embodiment, the network device 104 may selectively skip establishing and/or incrementing connection rate meters of the CBF for the connection at issue. For example, the system may not want to track the existence of the particular connection at issue.

Network device 104 may further refer to policies and process the packet based on the determination of whether the packet is a first packet or a subsequent packet. Network device 104 may selectively send the packet based on a policy associated with the n-tuple values. The network device 104 may also determine the processing load (e.g., the current load on memory and/or processing resources) on the host processor 110 as part of determining whether the packet should be sent to the host processor 110. In an embodiment, the network device 104 may process the packet based on a determination regarding whether the packet is part of a denial of service attack and if so, may decide to drop the packet. Non-limiting examples of a denial of service attack include a Transmission Control Protocol (TCP) SYN flood attack and a port scan. In an embodiment, the network device 104 may send a first packet or the subsequent packet to a destination device, for example, a server 108 based on an action specified by a matching policy rule.

The network device 104 may include a hardware accelerator module 206. In one embodiment the CBF may be implemented by the hardware accelerator module 206 to facilitate efficient packet classification and/or further processing relating to the packet based on defined policies. The network device 104 may have other processing resources, including one or more of a network processor, an embedded processor and/or a general-purpose processor to perform different functions. In some embodiments, the CBF may be implemented within one of such other processing resources.

Figure 2A:
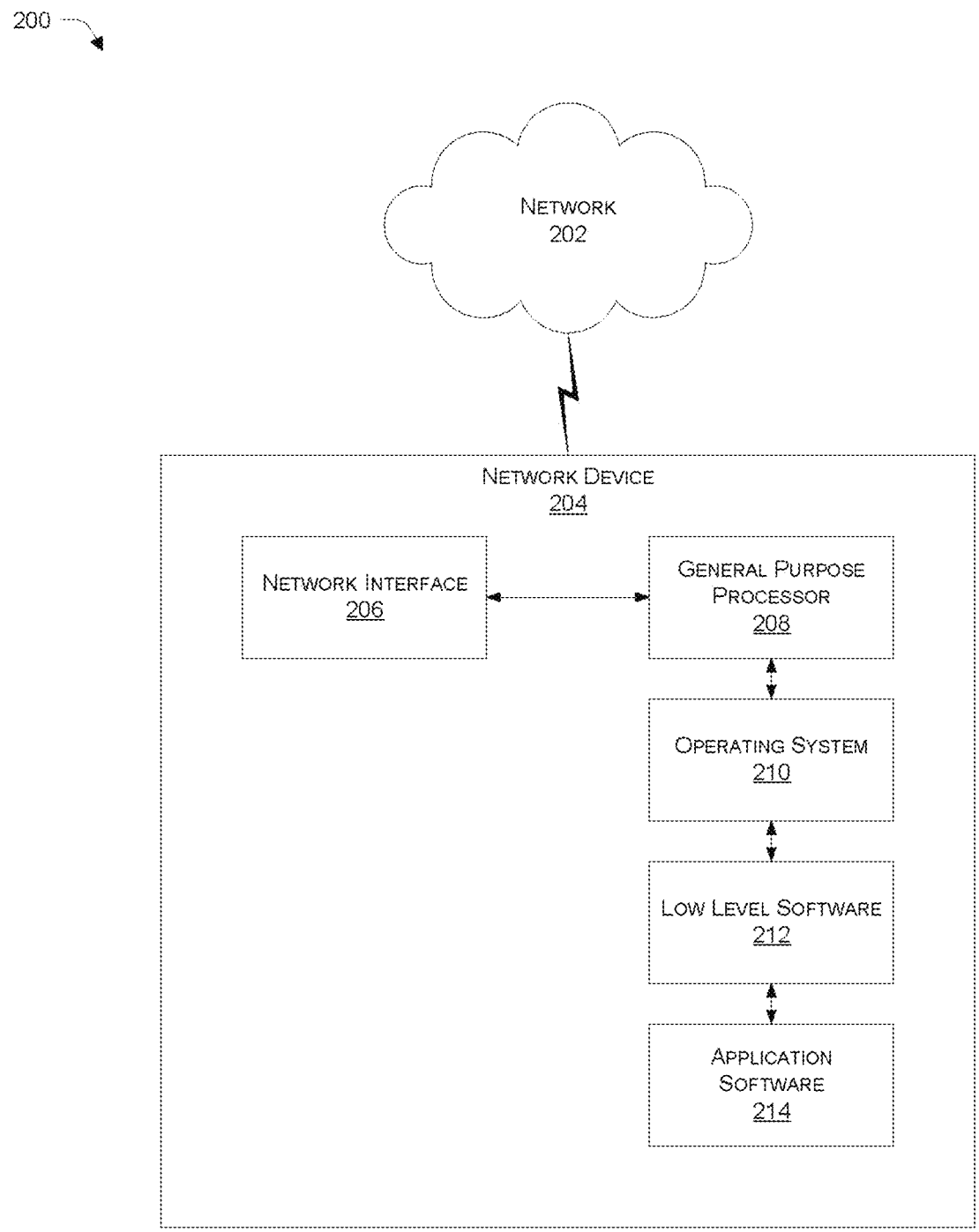
FIG. 2A is a block diagram illustrating an exemplary architecture of a network security device in which aspects of the present invention may be implemented in accordance with an embodiment of the present disclosure.

FIG. 2A is a block diagram illustrating an exemplary architecture 200 of a network device 204 in which aspects of the present invention may be implemented in accordance with an embodiment of the present disclosure. In an embodiment, various network packet processing functions, including packet classification and forwarding or blocking can be performed by a general-purpose processor 208. In the context of the present example, the network device 204 may represent a network security device (e.g., a firewall appliance, a UTM appliance, an IDS/IPS, or the like) and includes a network interface 206 that can act as a point of interconnection between network device 204 and a network 202. Network 202 can be a dedicated network (e.g., a private network, or corporate network) or a shared network like the Internet. A shared network may represent an association of the different types of networks that use a variety of protocols, for example, Hypertext Transfer Protocol (HTTP), Transmission Control/Internet Protocol (TCP/IP), Wireless Application Protocol (WAP), and the like.

Network interface 206 can be operatively coupled to a general-purpose processor 208 for processing network traffic and performing network functions. General-purpose processor 208 can be operatively coupled to one or more other processors and may collectively run compute-intensive applications at issue. General-purpose processor 208 can run an operating system 210 for managing various resources and interfaces. Further, operating system 210 can run a program or group of programs designed for end-users. A non-limiting example of operating system 210 is the FORTIOS network operating system, which is available from Fortinet, Inc. of Sunnyvale, Calif.

Different programs executed on a network device 204 can be divided into two classes, namely low-level software 212 and application software 214 that can be executed by an operating system 210. While low-level software 212 includes a low-level program that interacts with computing devices at a basic level, application software 214 resides above system software and may include applications such as database programs, network security functionalities, and the like.

Figure 2B:
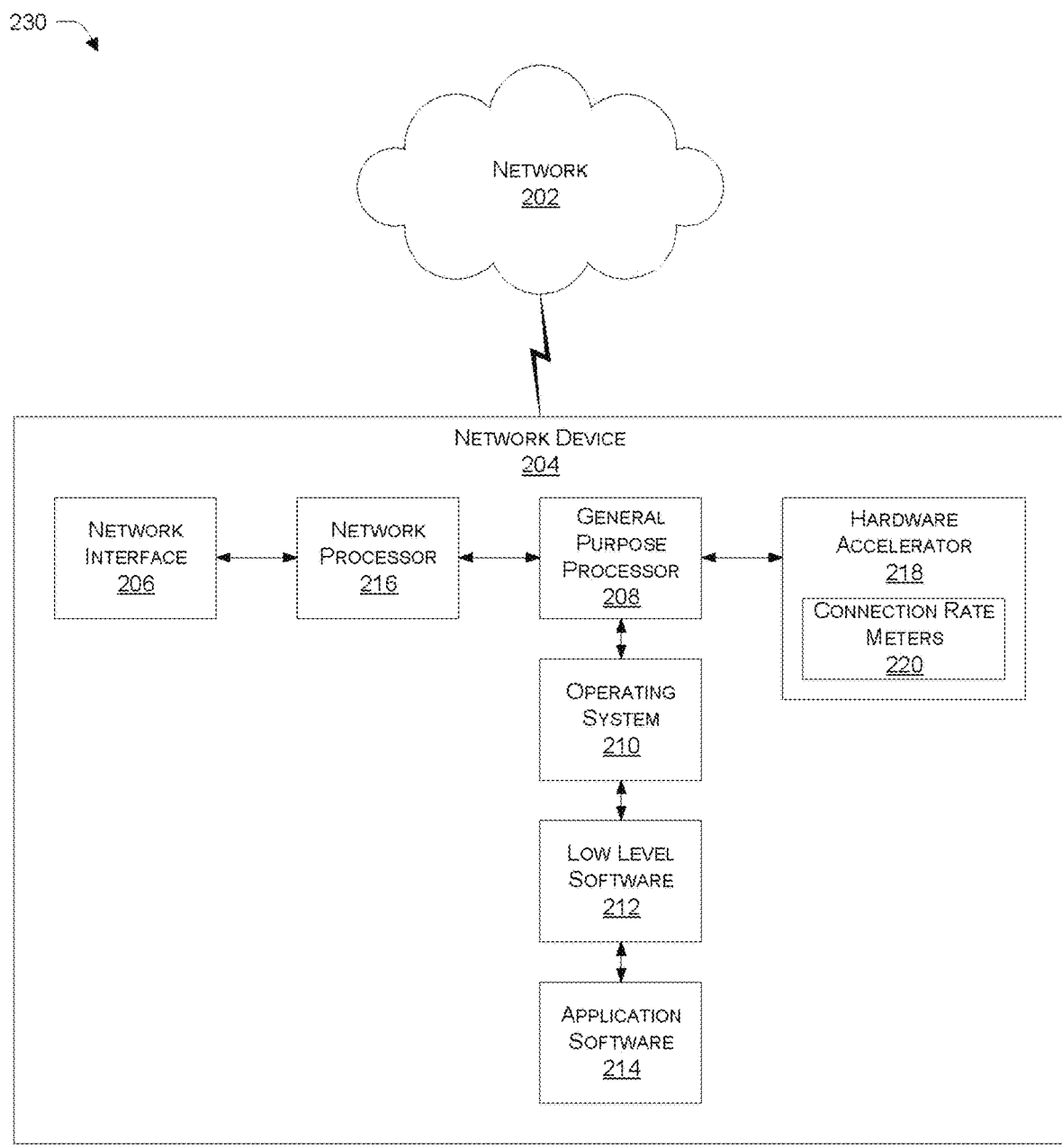
FIG. 2B is a block diagram illustrating an exemplary architecture of a network security device with a hardware accelerator in accordance with an embodiment of the present disclosure.

FIG. 2B is a block diagram 230 illustrating an exemplary architecture of a network device 204 with a hardware accelerator 218 in accordance with an embodiment of the present disclosure. As shown in block diagram 230, the network device 204 may include a network processor 216 in addition to the general-purpose processor 208. When a packet is received at network interface 206, it can be first processed by the network processor 216 to perform packet classification and then forwarded to the general-purpose processor 208. One or more functions specific to packet processing and filtering can be assigned to the network processor 216 and other functions may be executed by the general-purpose processor 208. The network device 204 may further include a hardware accelerator 218, which can be controlled by the general-purpose processor 208 and which may execute some specific functions. The hardware accelerator 218 may be used for hardware accelerating certain compute-intensive functions, such as those involving classification of packets using a CBF and maintaining connection rate meters. Hardware accelerator 218 is operatively coupled to general-purpose processor 208 and includes a hardware acceleration sub-system. The hardware accelerator 218 may include connection rate meters 220 and perform functionality associated with maintaining connection rate meters values. The hardware accelerator 218 may decrease latency and increase the throughput of the general-purpose processor 208.

In an embodiment, a general-purpose processor 208 may process the packets based on defined policies. Depending upon the particular implementation, the entire packet classification process may be performed in software or some portion of the process may be hardware accelerated.

The any or combination of general-purpose processor 208, network processor 216 or hardware accelerator 218 can be configured to receive an incoming packet, extract n-tuple values (e.g. source IP address, source port, destination IP address, IP address, protocol) of the incoming packet, searches information associated with the n-tuple values using a CBF, classify the incoming packet as a first packet or a subsequent packet of a transport protocol connection based on a result of the CBF and processes the incoming packet based on whether the incoming packet is the first packet or the subsequent packet.

Figure 2C:
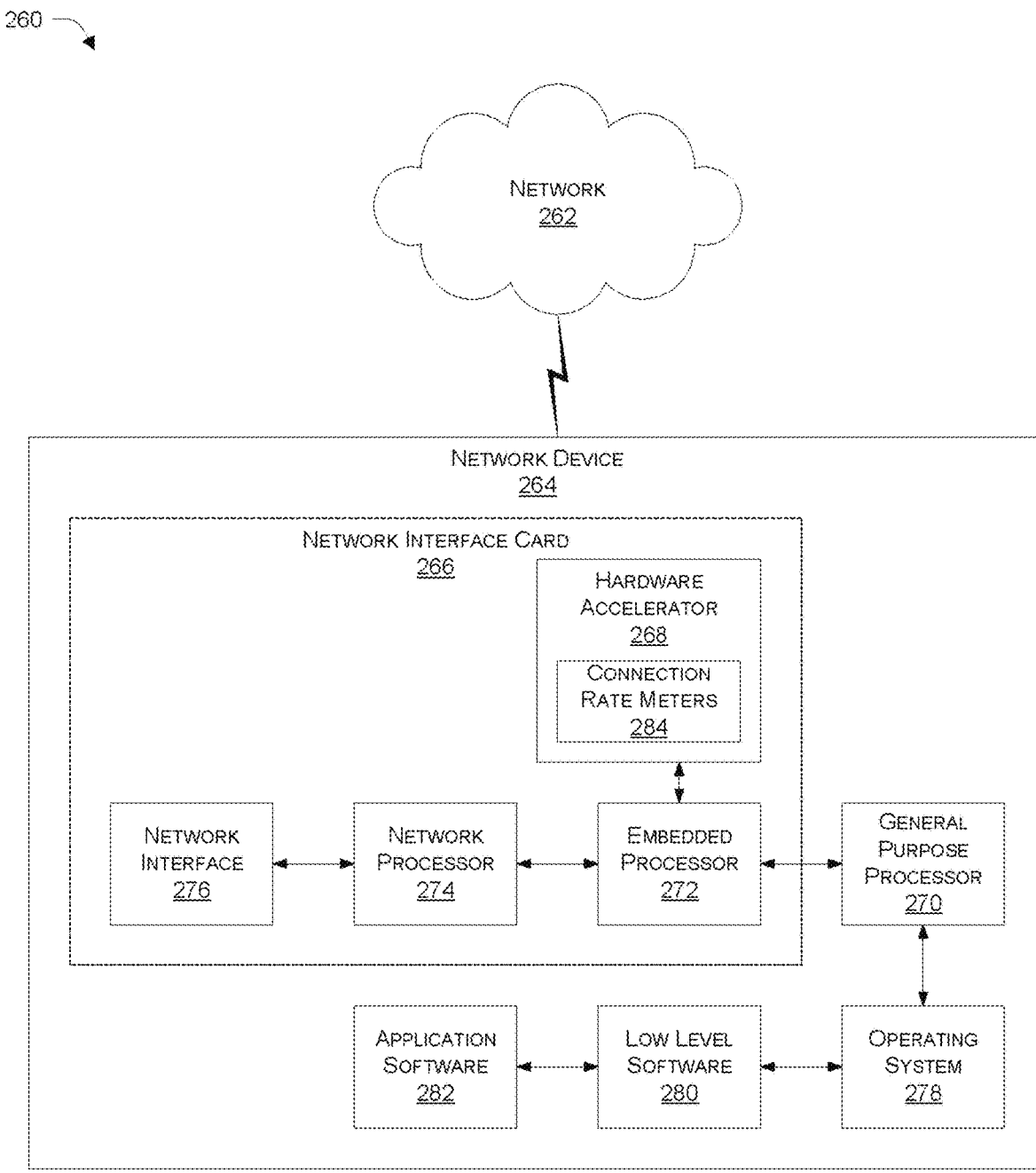
FIG. 2C is a block diagram illustrating an exemplary architecture of a network security device with a network interface card in accordance with an embodiment of the present disclosure.

FIG. 2C is a block diagram 260 illustrating an exemplary architecture of a network device 264 with a network interface card 266 in accordance with an embodiment of the present disclosure. In the context of the present example, network device 264 may include operating system 276, low-level software 280, and application software 282 and may perform functionalities similar to operating system 210, low-level software 212 and application software 214 respectively. In one implementation, hardware accelerator 268 may be implemented within NIC 266 to allow the hardware acceleration function to be used by a general-purpose processor 270 as well as other devices that may be co-located in a data center, for example, with the network device 264. Further, NIC 266 may provide traffic classification service and processing services to other host systems or network nodes operatively coupled with the NIC 266 without using the processing of the general-purpose processor 270.

Depending upon the particular implementation, NIC 266 may be in form of a discrete device that can be interfaced or operatively coupled with the general-purpose processor 270 and can be used to provide hardware acceleration on behalf of the general-purpose processor 270, which may involve, among other things, running a CBF to classify packets as a first packet of a connection or a subsequent packet in an existing connection.

According to an embodiment, embedded processor 272 of NIC 266 may be operatively coupled with the hardware accelerator 268 and with the general-purpose processor 270. NIC 266 may further include network interface 276 that receives network traffic, and a network processor 274 to process a network flow. In an embodiment, the hardware accelerator 268 can be configured to perform packet classification using a CBF and maintain values of connection rate meters 284. Metering operations can be performed by the hardware accelerator 268.

Figure 3:
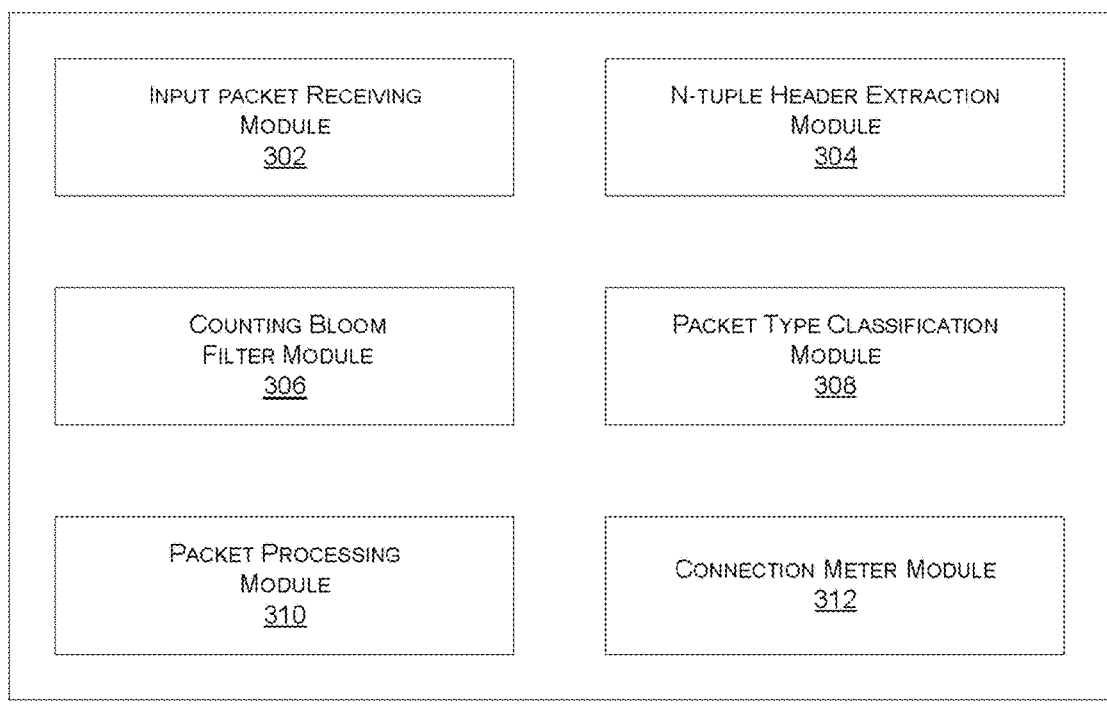
FIG. 3 illustrates functional modules of a packet processing system in accordance with an embodiment of the present disclosure.

FIG. 3 illustrates functional modules of a packet processing system 300 in accordance with an embodiment of the present disclosure. The packet processing system 300 includes an input packet receiving module 302 configured to receive, at a processing resource, an incoming packet, an N-tuple header extraction module 304 configured to extract n-tuple metadata (e.g. source IP address, source port, destination IP address, IP address, protocol) of the incoming packet, a CBF module 306 configured to search information associated with the n-tuple header using a CBF, a packet classification module 308 configured to classify the incoming packet as a first packet or a subsequent packet of a transport protocol connection based on a result of the CBF, and packet processing module 310 configured to process the incoming packet based on whether the incoming packet is the first packet or the subsequent packet. The system 300 may further include a connection meter module 312 configured to maintain multiple connection rate meters. For example, one or more connection rate meters may be maintained for each destination Internet Protocol (IP) address, source IP address, and/or security policy.

The system 300 receives a packet, extracts n-tuple values from a header of the packet that is indicative of a particular transport protocol connection with which the packet is associated, determines whether the particular transport protocol connection represents an active transport protocol connection represented within a CBF by searching the CBF based on the n-tuple values.

The CBF module 306 performs search operations. The n-tuple extracted by the N-tuple header extraction module 304 is fed to CBF module 306. The n-tuple includes a source IP address, destination IP address, layer four protocol, source port, destination port, IP address family and other such information. The CBF module 306 searches the CBF by calculating K hash values by applying K hash functions to the n-tuple values extracted from the packet, reads K memory locations corresponding to the K hash values, wherein each of the K memory locations contains one of the counters, and evaluates whether all K memory locations contain non-zero values. A memory associated with the CBF may be portioned into k memory spaces. In an embodiment, the K hash values point to one of k memory spaces into which the CBF memory has been partitioned. Alternatively, the K hash values may point to the same memory space. Non-limiting examples of hash functions that may be used include Cyclic Redundancy Check (CRC) and exclusive ORs (XORs) with random seeds.

In an embodiment, the CBF receives the n-tuple header of the incoming packet, hashes the n-tuple values to calculate k hash values, reads k memory locations (counters) corresponding to meters the k hash values, and determines whether the value at each of the k memory locations is non-zero. The result of the CBF search is said to be affirmative if the value at all of each of the k memory locations is non-zero. The result of the CBF search is said to be negative if the value at any of the k memory locations is zero.

In an embodiment, the CBF initially sets the values of all memory locations to zero, and updates the values responsive to various events described herein. According to one embodiment, the value at each of the k memory locations is incremented if the incoming packet is the first packet and value at the respective memory location of the k memory locations is decreased based on aging out policy. The aging out policy is defined based on any or combination of a fixed time duration parameter, a last match duration parameter, and a retirement FIFO parameter. In an embodiment, incrementing the value at each of the k memory locations is dependent on one or more statistical values, wherein the one or more statistical values comprise connection rate meter values.

The packet type classification module 308 classifies the packet based on the search outcome as a subsequent packet of the active transport protocol connection when said search determining is affirmative, and classifies the packet as first packet of a new transport protocol connection when said determination is negative. The incoming packet is classified as the first packet if the value at any of the k memory locations is zero and the incoming packet is classified as the subsequent packet if the value at each of the k memory locations is non-zero.

The packet processing module 310 processes the packet in accordance with its classification as the first packet or the subsequent packet. The packet processing module 310 selectively sends the lead fragment to a host or drops the lead fragment based on the determination of whether the fragmented packet is a follow-on packet of the sequence group. When the fragmented IP packet is a follow-on fragment of the sequence group, the processing resource selectively sends the follow-on fragment to a host or drops the follow-on fragment based on whether the lead fragment of the sequence group was sent to the host. The packet processing module 310 selectively sends the fragmented packet to the host based on a policy associated with the n-tuple values. In an embodiment, the packet processing module 310 selectively sends the fragmented packet to the host based on a current processing load being experienced by the host. In an embodiment, the system 300 may classify the fragmented IP packet into a sequence group of multiple sequence groups when the packet is a fragmented IP packet. The packet processing module 310 may refer to other security policy rules to make a determination of whether the subsequent packet is part of a denial of service attack, and drops the subsequent packet if its determined to be part of the denial of server attack.

The connection rate meter module 312 maintains multiple connection rate meters. For example, multiple connection rate meters may be maintained for each destination Internet Protocol (IP) address, source IP address, and/or security policy. The connection rate meter module 312 may update the value of one or more meters associated with a particular connection responsive to various of the events described herein. For example, meters may be updated based on the determination of whether the packet is the first packet or the subsequent packet and how the packet is processed.

The connection rate meter module 312 maintains a queue entry containing information indicative of those counters of the multiple counters corresponding to the n-tuple values to a retirement queue when the said determination is negative. The connection rate meter module 312 may increment the values of those counters of the multiple counters corresponding to the n-tuple values associated with a search request and may decrement one or more counters when a decrement event is detected for one or more counters of the multiple counters. In an embodiment, the decrement event includes the retirement queue reaching a predetermined or configurable depth threshold or a timestamp of a top queue entry of the retirement queue meeting a time threshold. Based on the classification of the packet and further processing decision taken by the packet processing module 310, the connection meter module 312 may update the connection rate meters associated with respective n-tuple when the respective match is found. In an embodiment, the retirement queue can also be partitioned into multiple spaces. According to one embodiment, the retirement queue partitioning is controlled by policy lookup results. In another embodiment, the retirement queue partitioning may be controlled by the meter threshold. For instance, connections with high meter thresholds may use retirement queue space H, while connections with low meter thresholds may use retirement queue space L. In another embodiment, the CBF may be partitioned into multiple spaces, controlled by the meter threshold and/or policy IDs. For instance, connections with high meter thresholds may use CBF space H, while connections with low meter thresholds may use CBF space L.

In an embodiment, updating (e.g., incrementing and/or decrementing) values of the CBF counters can be optionally qualified, for example, by events associated with the meters exceeding their respective thresholds and/or by a policy associated with the connection at issue. If a connection's first packet meter(s) exceeds a threshold, it's likely to be treated as an attack. Optionally, the system 300 can skip the CBF counter increment for this connection and the packet will be dropped and the connection will be terminated anyway.

In an embodiment, the system 300 may include any or a combination of a hardware accelerator, a general-purpose processor, an embedded processor, and a network processor for efficient classification and processing of packets.

In an embodiment, the system 300 may process the incoming packet using a policy rule that defines an action to be taken on a packet based on connection rate meter values. The processor determines the updated values of the connection rate meters and processes the incoming packet based on the policy rule and the updated values of connection rate meters. The incoming packet is dropped if the value of any of the connection rate meters exceeds the corresponding value of the connection rate meter defined in the policy rule.

As those skilled in the art will appreciate, efficient determination of whether an incoming packet represents a first packet of a new transport protocol connection or a subsequent packet of an existing transport protocol connection can help in providing early warning and mitigation of a potential Denial of Service (DoS) attack. In one embodiment, the system 300 performs packet processing to mitigate a DoS attack using a DoS attack mitigation policy. In an embodiment, the system may determine the load on a host device where the incoming packet is to be processed next and decides whether the incoming packet should or should not be dropped or forwarded to the host device. As those skilled in the art will appreciate, the proposed system works for any layer four protocol and is not restricted to Transmission Control Protocol (TCP). The proposed system provides better efficiency in terms of determination of whether the packet is a first packet or a subsequent packet of a connection on the basis of CBF counters and without memory resource usage and time delays associated with maintenance of a session table for this purpose.

Figure 4:
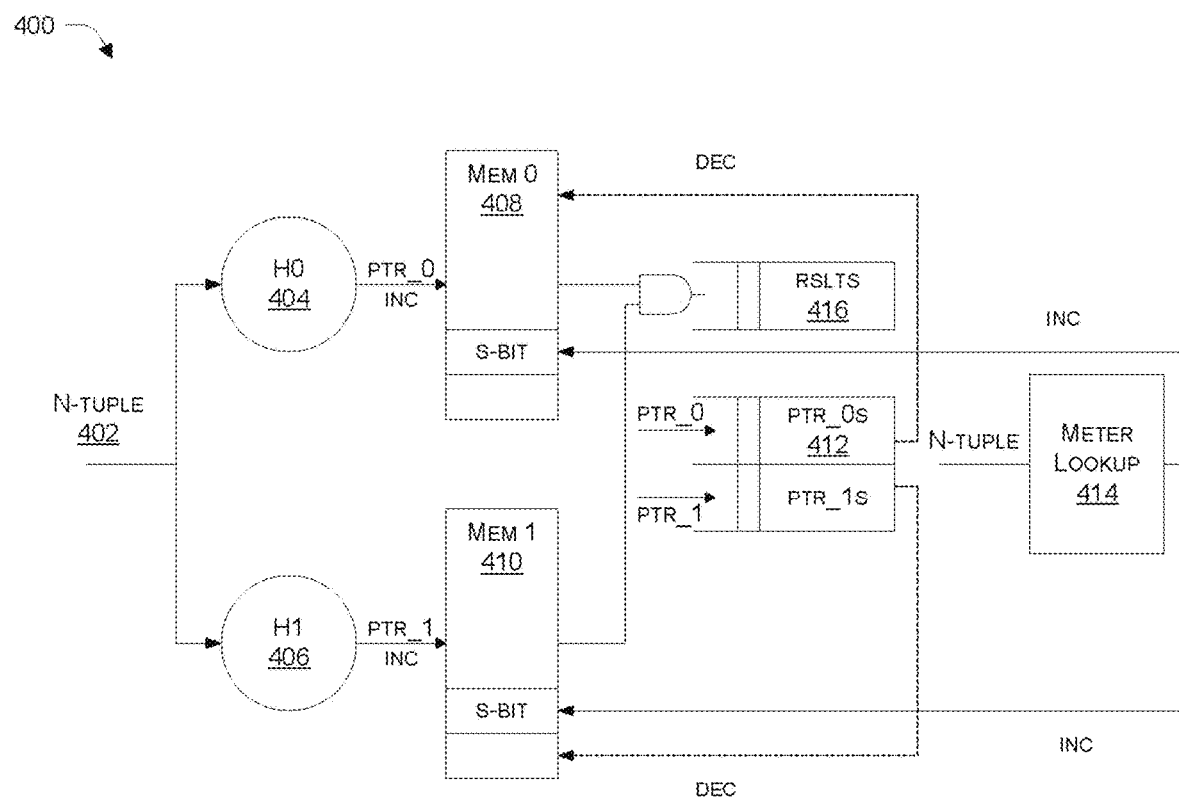
FIG. 4 illustrates an example hardware implementation of a CBF in accordance with an embodiment of the present disclosure.

FIG. 4 illustrates a hardware implementation of a CBF 400 in accordance with an embodiment of the present disclosure. The hardware implementation may be part of a hardware accelerator (e.g., hardware accelerator 218 or 268) of a network device (e.g., network device 104, 204, or 264). In the context of the present example, the CBF 400 may receive an n-tuple 402 extracted from a packet, perform k different hashes, for example, two hashes—H0 404 and H1 406 to generate respective hash values. The CBF 400 may use any or combination of hash functions, including but not limited to CRC and XOR with random seeds. As one may appreciate, for a particular field (e.g., destination IP, source IP, destination port, source port, protocol, etc.) of n-tuple 402 the CBF 400 may be configured to use the same hash function.

As shown in FIG. 4, the hash value generated by hash function H0 404, and hash value generated by hash function H1 406 may act as pointer PTR_0 and PTR_1, to a particular memory space (e.g., Mem 0 408 and Mem 1 410, respectively) containing one or more counters to be incremented. While in the present example, each pointer PTR_0 and PTR_1 points to a separate memory space, in alternative embodiments, the pointers may be used to access the same memory space. At the time of initialization, the values of all memory locations in Mem 0 408 and Mem 1 410 may be set to zero.

The n-tuple 402 may include values of one or more of the source IP address, the destination IP address, the layer four protocol, the source port, and the destination port of a packet at issue. All or a portion of the n-tuple 402 may be input to multiple hash functions (e.g., H0 404 and H1 406) to generate respective pointers (e.g., PTR_0 and PTR_1).

As shown in FIG. 4, the hash function generated pointers may be used to access a memory space associated with the hash function to retrieve an s-bit unsigned integer value representing a counter. Alternatively, the pointers may access a common (non-partitioned) memory space. In one embodiment, when any of the counters are zero, the packet is classified as the first packet of a connection and when all of the counters are non-zero, the packet is classified as a subsequent packet of a previously observed connection that has yet to be timed out. In general, connections may be tracked by incrementing the counters when the first packet of a connection is observed by the CBF and decrementing those counters after a predetermined or configurable number of CBF searches or based on the passing of a predetermined or configurable amount of time.

In an embodiment, results (e.g., RSLTS 416) of the CBF search may be generated by a simple AND gate implementation in which the k s-bit unsigned integer values accessed based on the hash value pointers are input to an AND gate. When the corresponding value at each memory location is non-zero, the result of the AND operation is "1," which is indicative of an affirmative CBF search result. Alternatively, when any memory location contains a zero value, the result of the AND operation will be "0," which is indicative of a negative CBF search result. In the context of the present example, the values at these memory locations identified by the hash value pointers are increased subject to optional qualification by a meter lookup 414 based on the n-tuple. Additionally, counters corresponding to the top entry of the retirement queue 412 may be decremented. For example, after a predetermined amount of time or after a predetermined number of packets have been processed, counters that were previously incremented can be decremented. In this manner, when there has been no active CBF search for a particular connection, the counters are gradually cleared. In an embodiment, the decrementing of the counters can be optionally qualified by the events of the meters exceeding their thresholds as determined by meter lookup 414. Similarly, in an embodiment, comparison results of the meter lookup 414 can optionality qualify the CBF increment operation.

In an embodiment, hash value pointers to memory locations that are incremented are queued on a retirement queue (e.g., FIFO 412) and a timer may be used to trigger popping of pointers from the FIFO 412. In this manner, when there is no active CBF search for a certain period of time or after receiving of a certain number of packets, memory locations that have previously been incremented and queued on the FIFO 412 may be decremented. As those skilled in the art will appreciate, by gradually decreasing the values of memory locations using a time-based or FIFO 412 implementation, memory is gradually purged. In an embodiment, the FIFO 412 may be implemented by a general-purpose processor or by an embedded processor of the network device.

In an embodiment, the FIFO 412 may be partitioned into multiple spaces, for different rate ranges. For example, the FIFO 412 may be partitioned into multiple spaces, for example, one for high threshold meters and one for low threshold meters. The CBF search result may include information about which FIFO space the current packet belongs to and assign it to the right FIFO. According to one embodiment, the retirement queue partitioning may be controlled by policy lookup results. According to another embodiment, the retirement queue partitioning may be controlled by the meter threshold. For instance, connections with high meter thresholds may use retirement queue space H, while connections with low meter thresholds use retirement queue space L.

In an embodiment, for each increment operation the corresponding hash value pointers are queued on the FIFO 412, which after a certain amount of time or certain number of packets will cause the hash value pointers to arrive at the top of the FIFO 412 and ultimately allow the corresponding memory locations to be decremented.

Figure 5:
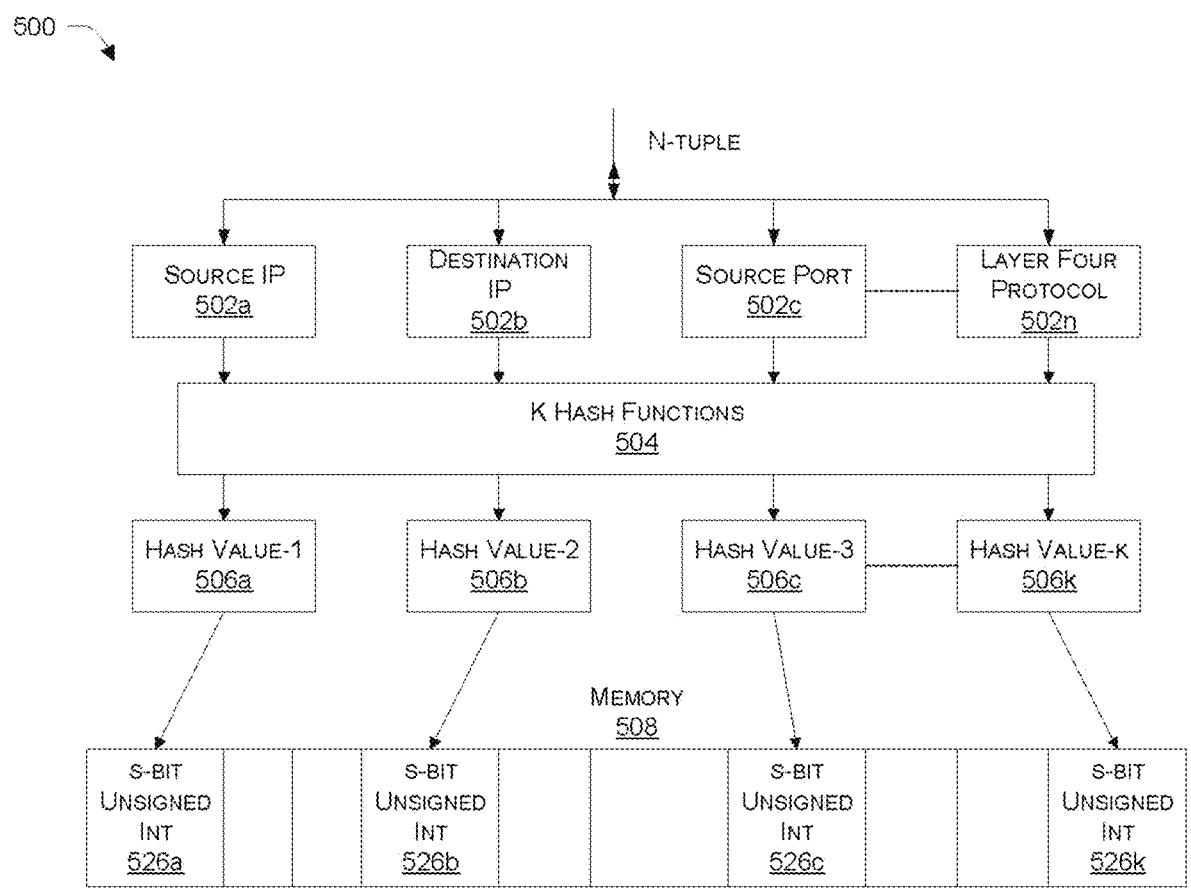
FIG. 5 is a block diagram illustrating CBF processing in accordance with an embodiment of the present disclosure.

FIG. 5 illustrates an exemplary block diagram 500 of CBF processing in accordance with an embodiment of the present disclosure. As shown in FIG. 5, n-tuple information, which in this example includes source IP 502a, destination IP 502b, source port 502c and layer four protocol 502n information can each be passed to k hash functions 504 to generate respective hash values (e.g., hash value 1 506a, hash value 2 506b, hash value 3 506c and hash value k 506k). Each hash value is used as a pointer into a memory 508. For example, hash value 1 506a, hash value 2 506b, hash value 3 506c, and hash value k 506k points to memory location 508a, memory location 508b, memory location 508c and memory location 508k, respectively. These memory locations may be configured to store S-bit unsigned integer values 526a-k.

Figure 6:
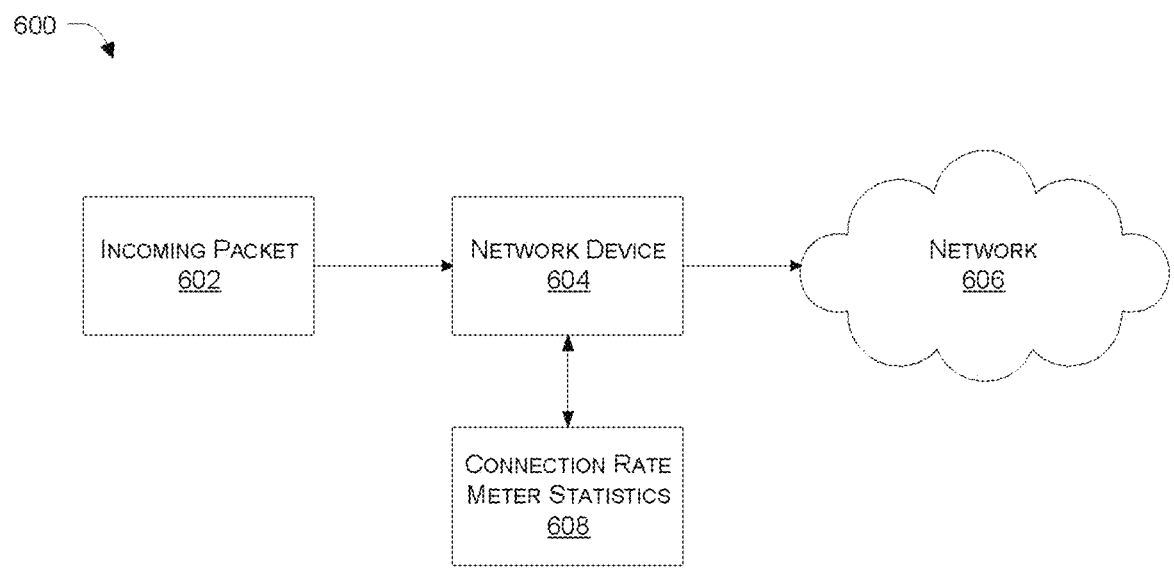
FIG. 6 illustrates an example of packet processing to mitigate a DoS attack in accordance with an embodiment of the present disclosure.

FIG. 6 illustrates an example packet processing 600 to mitigate a DoS attack in accordance with an embodiment of the present disclosure. As shown in FIG. 6 an incoming packet 602 may be received by a network device 604, which may determine whether the packet is a first packet or a subsequent packet using a CBF (not shown). The network device 608 may refer to connection rate meter statistics 608 to determine whether the statistics related to the n-tuple information of the incoming packet are indicative of a DoS attack, for example, as a result of one or more meters exceeding a predetermined or configurable value. In an embodiment, the network device 604 may drop the incoming packet 602 based on (i) a determination of whether the packet is a first packet or subsequent packet and (ii) connection rate meter statistics 608. The network device 604 may forward the packet 602 to other devices on network 606 when the corresponding policy rules allow it to forward the packet 602 after analyzing the type of packet as classified by the CBF and connection rate meter statistics 608.

Figure 7:
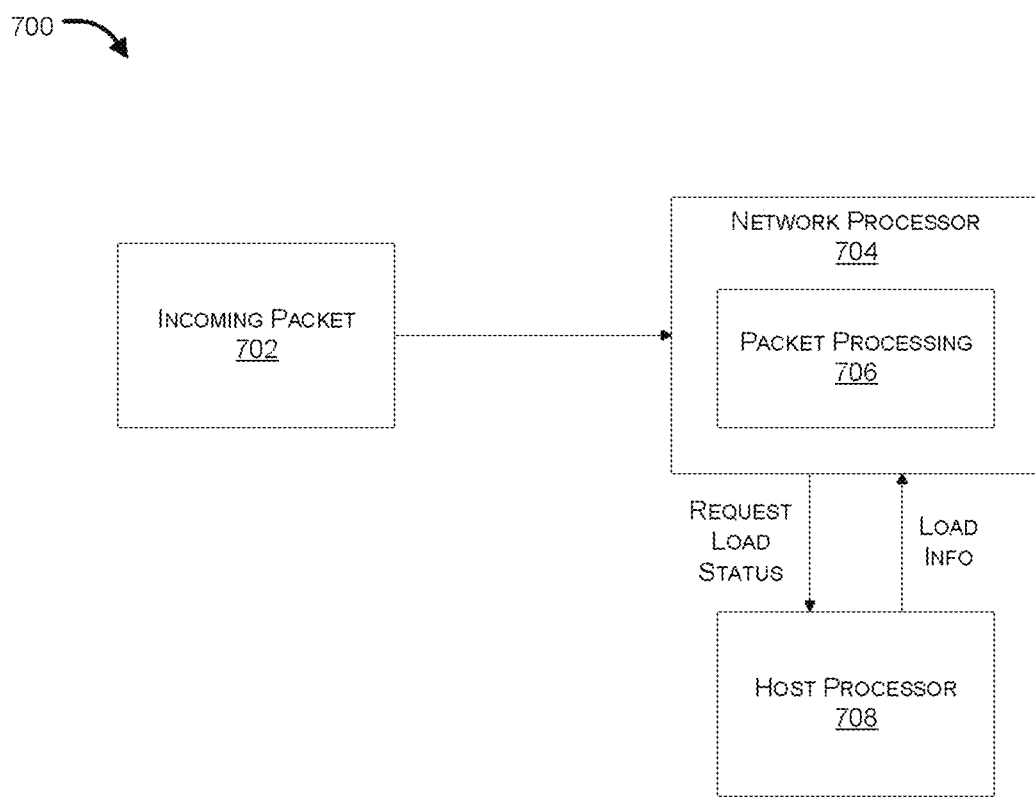
FIG. 7 illustrates packet processing based on load of a host device in accordance with an embodiment of the present disclosure.

FIG. 7 illustrates a packet processing 700 based on load of a host device in accordance with an embodiment of the present disclosure. In an embodiment, a network processor 704 may receive an incoming packet 702, determine whether the packet 720 is a first packet of a connection or a subsequent packet of a connection, and perform packet processing 706 based on the determination. In an embodiment, if other rules allow the incoming packet to be forwarded to a host processor 708, the network device 704 may further determine the processing load status of a host processor 708 before forwarding the packet. The network device 704 may request load status of the host processor 708 and receive load information. The network device 704 may use the load status of the host processor 708 in addition to other parameters to perform packet processing 706. For example, if the load on the host processor 708 exceeds a predefined or configurable threshold, the network device 704 may drop the packet. This may protect the host processor 708 from different types of flood attacks.

The processing described below with reference to the flow diagrams of FIGS. 8-10 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry (e.g., a hardware accelerator module). For example, the processing may be performed by one or more virtual or physical network devices of various forms, such as the computer system described with reference to FIG. 11 below.

Figure 8:
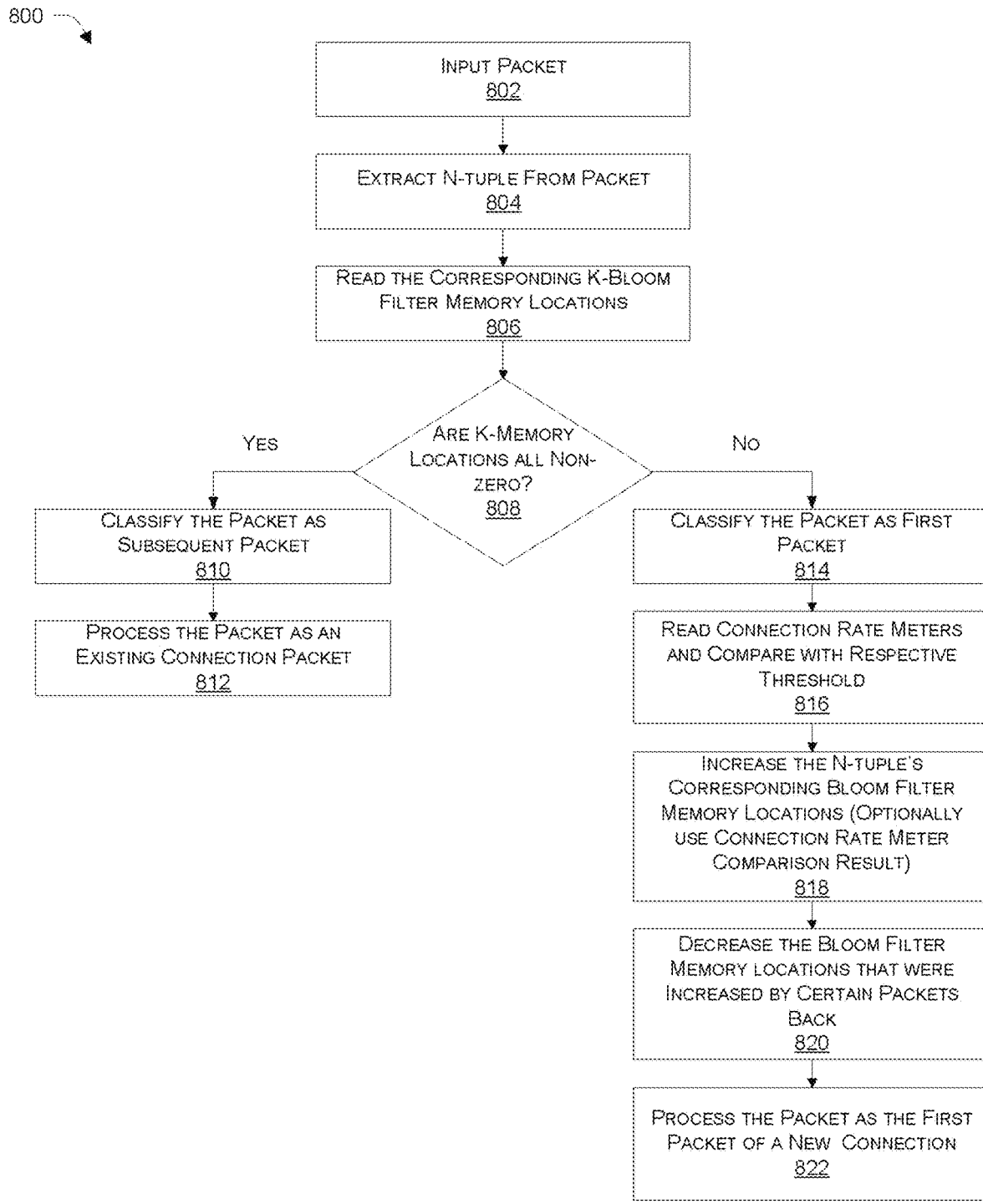
FIG. 8 is a flow diagram illustrating CBF search processing in accordance with an embodiment of the present disclosure.

FIG. 8 is a flow diagram 800 illustrating CBF search processing in accordance with an embodiment of the present disclosure. As shown in flow diagram 800, a network device (e.g., network device 104, 204, or 264), may receive an input packet as shown at block 802, and extract the n-tuple information from the header of the packet as shown at block 804. The n-tuple information may include values of a source IP address, a destination IP address, a layer four protocol, a source port, a destination port, an IP address family, and other such header information of the packet.

At block 806, a CBF (e.g., CBF 400) reads the corresponding k CBF memory locations. For example, each portion of the n-tuple information may be input to a hash function to obtain k hash value pointers, identifying the memory locations.

At decision block 808, it is determined whether all k memory locations are non-zero. If so, then processing continues with block 810; otherwise, processing branches to block 814. According to one embodiment, the individual n-tuple values extracted from the header of the incoming packet are fed to k hash functions and each of these hash functions generates a hash value. These k hash values may be used as k pointers to read k memory locations from a single memory space, wherein each memory location holds an S-bit unsigned integer value. The CBF search is said to be a hit or affirmative when all the k memory locations' values are non-zero.

At block 810, the input packet is classified as a subsequent packet and is processed as a packet associated with an existing connection at block 812. Depending upon the meter lookup results and threshold comparisons, the packet may be identified as a legitimate packet and forwarded or the packet may be identified as being part of a DoS attack and dropped. Non-limiting examples of packets that may be identified as part of a DoS attack are those determined to be part of a Transmission Control Protocol (TCP) SYN flood and those determined to represent a port scan.

At block 814, the input packet is classified as a first packet of a connection.

At block 816, the CBF may read connection rate meters for this connection and compare the meter values with respective thresholds.

At block 818, the CBF may increment the counters associated with the k memory locations. In some embodiments, performance of the increment operation may be optionally qualified based on results of the connection rate meter comparison(s) performed at block 816.

At block 820, the CBF may cause the values stored within CBF memory locations that were increased a certain number of packets back or a certain amount of time ago to be decremented. For example, in one embodiment, when counters of the CBF are incremented, pointers to those counters are placed on a retirement queue (e.g., FIFO 412). In this manner, the memory locations that were incremented during a CBF search M packets ago may be popped from the top of the retirement queue and decremented. Alternatively, the pop of the retirement queue may be triggered by a timestamp of the top entry.

At block 822, based on the classification of the packet at block 814, the packet is processed by the network device a first packet of a new connection.

Figure 9:
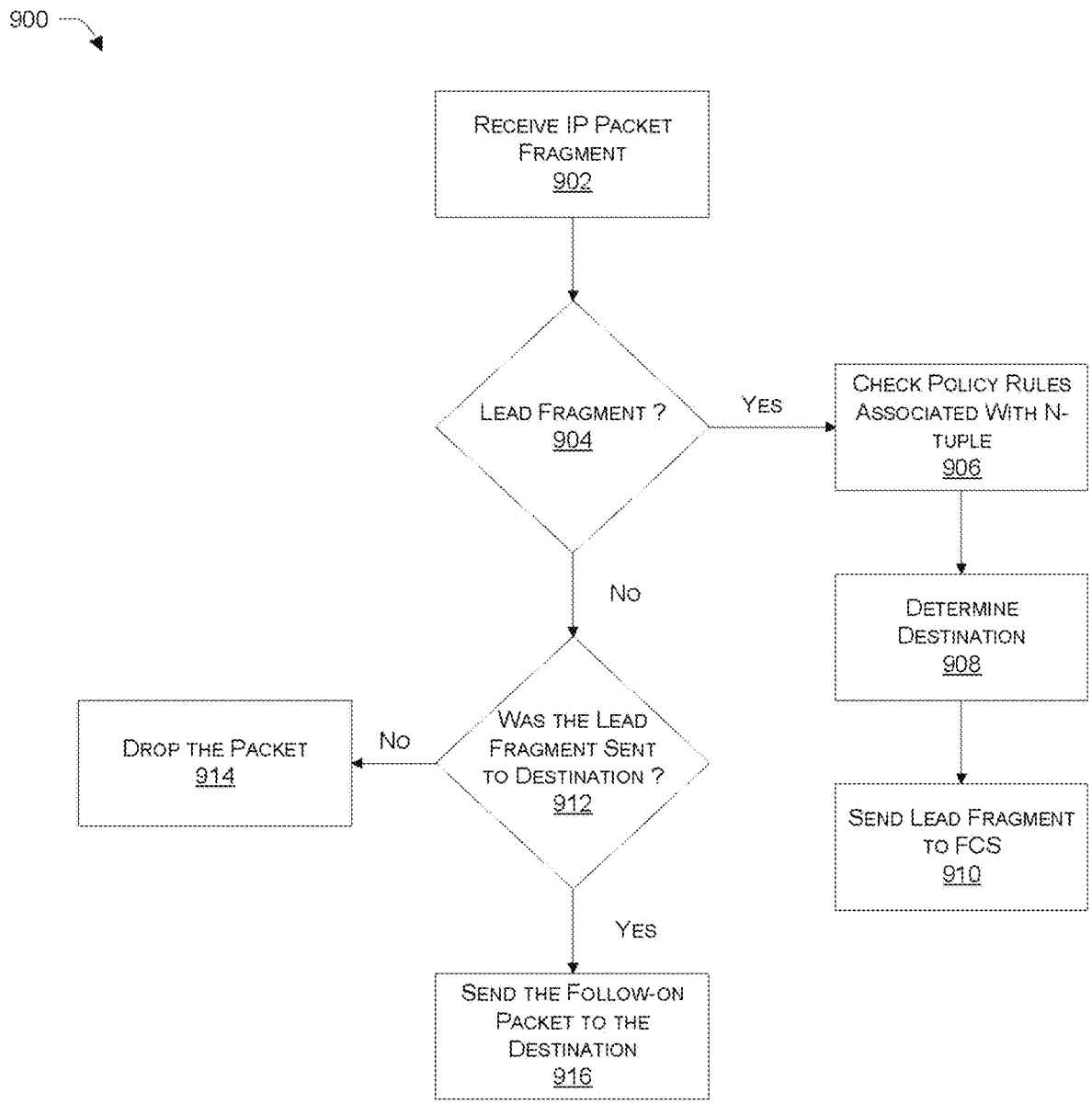
FIG. 9 is a flow diagram illustrating IP fragment processing in accordance with an embodiment of the present disclosure.

FIG. 9 is a flow diagram 900 illustrating IP fragment processing in accordance with an embodiment of the present disclosure. As shown in FIG. 9, a network device may receive an IP packet fragment, classify the fragmented IP packet into a sequence group of multiple sequence groups and as shown at block 902 and determine whether the fragmented packet is the lead packet of the sequence group as shown at block 904 or a follow-on packet of the sequence group using a CBF (e.g., CBF 400). If the determination is affirmative, meaning the fragmented packet is the lead packet, the network device may check policy rules associated with n-tuple of the packet as shown at block 906, determine its destination as shown at 908, and send the lead packet fragment to a Frame Check Sequence (FCS) as shown at block 910. If the determination at block 904 is negative, the network device may further check whether the lead fragment was sent to a destination as shown at block 912 and send the follow-on packet to the destination as shown at block 916. If the network device determines that the lead fragment was not sent to the destination, it may drop the packet as shown at block 914.

Figure 10:
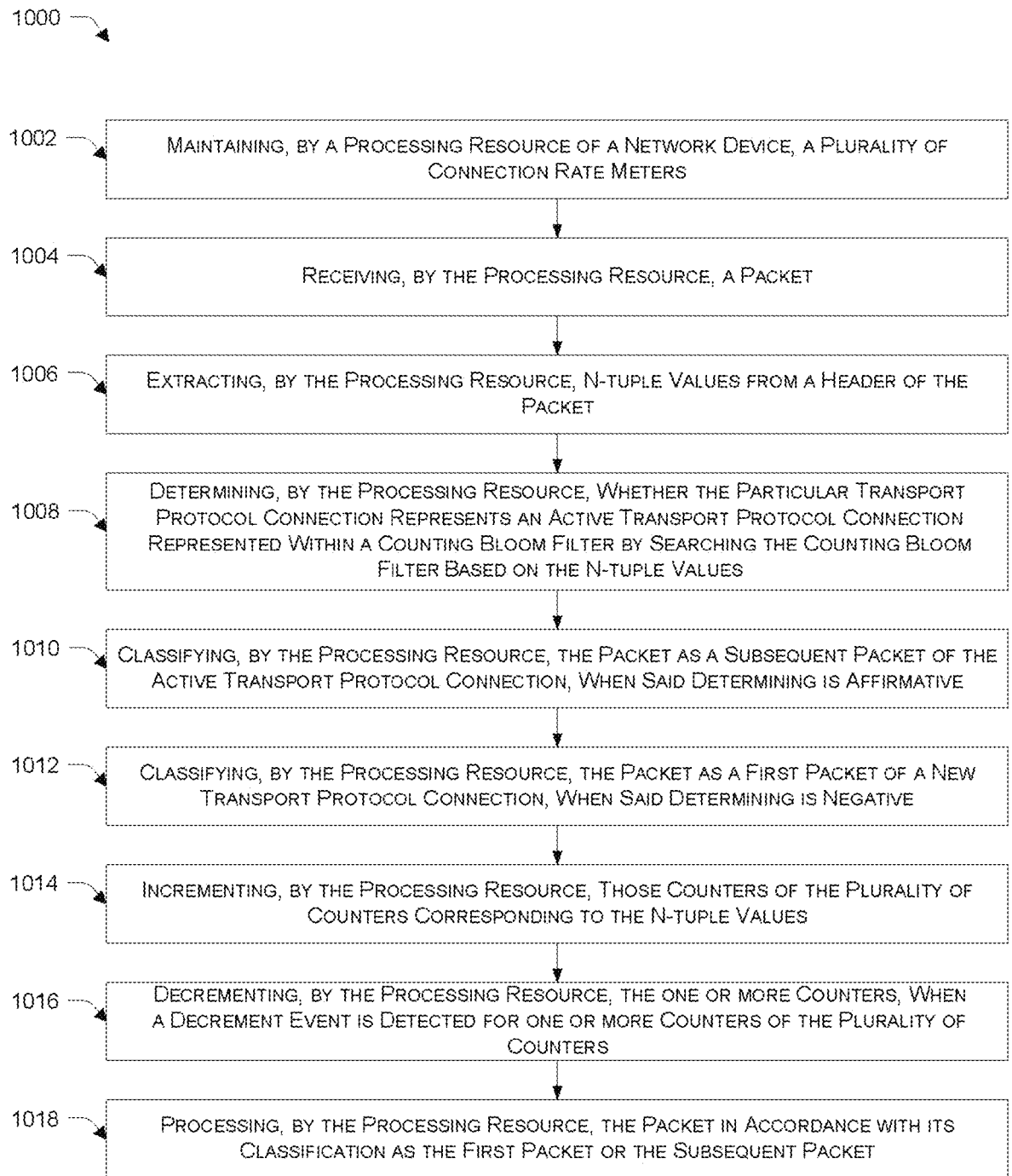
FIG. 10 is a flow diagram illustrating selective packet processing based on a CBF classification in accordance with an embodiment of the present disclosure.

FIG. 10 is a flow diagram 1000 illustrating selective packet processing based on a CBF classification in accordance with an embodiment of the present disclosure. In the context of the present example, a packet may be processed based on whether the packet represents a first packet of a new transport protocol connection or the packet represents a subsequent packet of an active transport protocol connection.

At block 1002, multiple connection rate meter are maintained by a processing resource (e.g., network processor 216 or 274, general purpose processor 208 or 270, embedded processor 272, or hardware accelerator module 106, 218, or 268) of a network device (e.g., network device 104, 204, or 264). The multiple connection rate meters may include one or more connection rate meters per destination Internet Protocol (IP) address, source IP address, and/or security policy. For example, for each unique n-tuple, a separate set of connection rate meters may be maintained.

At block 1004, a packet is received by the processing resource.

At block 1006, n-tuple values are extracted from a header of the packet. The n-tuple values are indicative of a particular transport protocol connection with which the packet is associated.

At block 1008, a determination is made regarding whether the particular transport protocol connection with which the packet is associated represents an active transport protocol connection within a CBF (e.g., CBF 400) by searching the CBF based on the n-tuple values. According to one embodiment, this determination is made based on counters maintained within memory locations of the CBF as described above with reference to FIG. 4.

At block 1010, when the determination performed at block 1008 is affirmative (i.e., the packet is determined to be associated with an active transport protocol connection), the packet is classified as a "subsequent" packet of the active transport protocol connection.

At block 1012, when the determination performed at block 1008 is negative (i.e., the packet is determined not to be associated with an active transport protocol connection), the packet is classified as a "first" packet of a new transport protocol connection.

At block 1014, those counters of the multiple counters corresponding to the n-tuple values are incremented. For example, the various n-tuple values may be fed into k separate hash functions to produce k hash value pointers that identify the respective counters in a partitioned or non-partitioned memory of the CBF.

At block 1016, responsive to a decrement event for one or more counters in the CBF memory, the counters are decremented. As noted above, the decrement event may represent the retirement queue (e.g., FIFO 412) reaching a depth threshold or a timestamp of a tope queue entry of the retirement queue meeting a time threshold.

At block 1018, the packet is processed in accordance with its classification.

Figure 11:
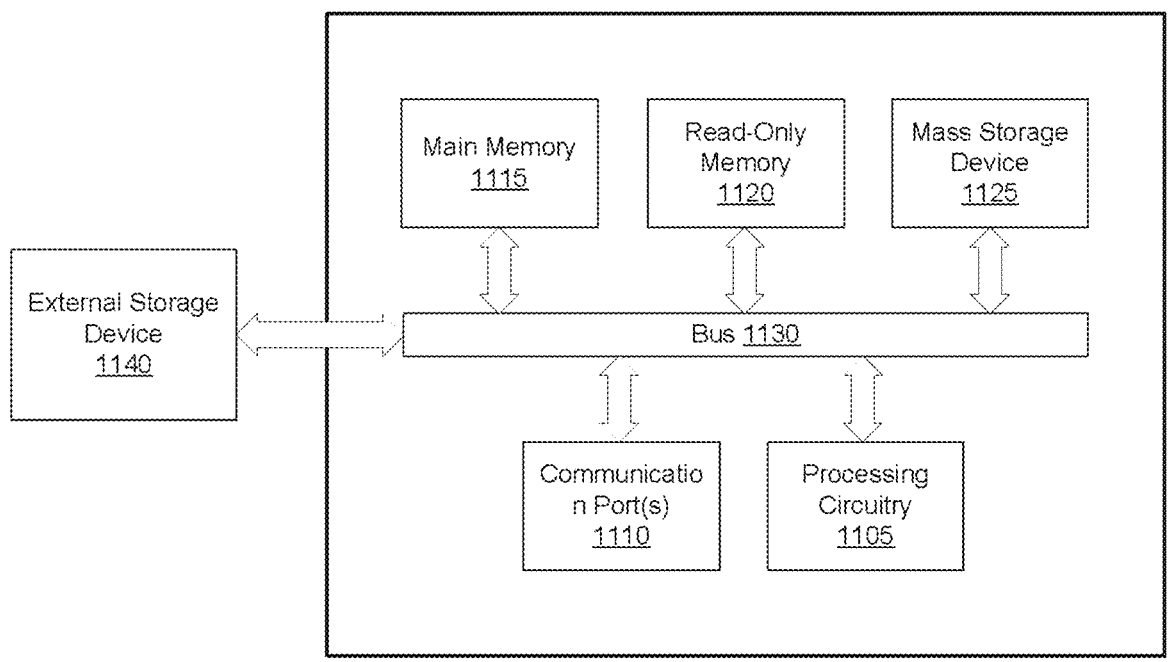
FIG. 11 illustrates an exemplary computer system in which or with which embodiments of the present invention may be utilized.

FIG. 11 illustrates an exemplary computer system in which or with which embodiments of the present invention may be utilized. As shown in FIG. 11, a computer system includes an external storage device 1110, a bus 1120, a main memory 1130, a read-only memory 1140, a mass storage device 1150, a communication port 1160, and a processing resource (e.g., processor 1170). Computer system may represent some portion of a network device (e.g., network device 104, 204, or 264).

Those skilled in the art will appreciate that computer system 1100 may include more than one processor 1170 and communication ports 1160. Examples of processor 1170 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 1170 may include various modules associated with embodiments of the present invention.

Communication port 1160 can be any of an RS-232 port for use with a modem-based dialup connection, a 10/100 Ethernet port, a Gigabit or 10 Gigabit port using copper or fiber, a serial port, a parallel port, or other existing or future ports. Communication port 760 may be chosen depending on a network, such a Local Area Network (LAN), Wide Area Network (WAN), or any network to which the computer system connects.

Memory 1130 can be Random Access Memory (RAM), or any other dynamic storage device commonly known in the art. Read Only Memory 1140 can be any static storage device(s) e.g., but not limited to, a Programmable Read Only Memory (PROM) chips for storing static information e.g. start-up or BIOS instructions for processor 1170.

Mass storage 1150 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1120 communicatively couples processor(s) 1170 with the other memory, storage and communication blocks. Bus 1120 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1170 to software system.

Optionally, operator and administrative interfaces, e.g. a display, keyboard, and a cursor control device, may also be coupled to bus 1120 to support direct operator interaction with computer system. Other operator and administrative interfaces can be provided through network connections connected through communication port 1160. External storage device 1110 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices can exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
maintaining, by a processing resource of a network device, a plurality of connection rate meters per one or more of destination Internet Protocol (IP) address, source IP address, and security policy;
receiving, by the processing resource, a packet;
extracting, by the processing resource, n-tuple values from a header of the packet that are indicative of a particular transport protocol connection with which the packet is associated;
determining, by the processing resource, whether the particular transport protocol connection represents an active transport protocol connection represented within a counting Bloom filter (CBF) by searching the CBF based on the n-tuple values, wherein the CBF includes a plurality of counters;
when said determining is affirmative, classifying, by the processing resource, the packet as a subsequent packet of the active transport protocol connection; and
when said determining is negative:
classifying, by the processing resource, the packet as a first packet of a new transport protocol connection; and
incrementing, by the processing resource, those counters of the plurality of counters corresponding to the n-tuple values;
when a decrement event is detected for one or more counters of the plurality of counters, decrementing, by the processing resource, the one or more counters; and
processing, by the processing resource, the packet in accordance with its classification as the first packet or the subsequent packet.

2. The method of claim 1, wherein the processing resource comprises any or a combination of a hardware accelerator, a general-purpose processor, an embedded processor, and a network processor.

3. The method of claim 1, further comprising:
when said determining is negative, adding, by the processing resource, a queue entry containing information indicative of those counters of the plurality of counters corresponding to the n-tuple values to a retirement queue; and
wherein the decrement event comprises the retirement queue reaching a depth threshold or a timestamp of a top queue entry of the retirement queue meeting a time threshold.

4. The method of claim 1, wherein the packet comprises a fragmented IP packet and wherein said processing comprises:
classifying, by the processing resource, the fragmented IP packet into a sequence group of a plurality of sequence groups; and
when the fragmented IP packet is a lead fragment of the sequence group, selectively sending the lead fragment to a host or dropping the lead fragment;
when the fragmented IP packet is a follow-on fragment of the sequence group, selectively sending the follow-on fragment to the host or dropping the follow-on fragment based on whether the lead fragment of the sequence group was sent to the host.

5. The method of claim 4, wherein said selectively sending is based on a policy associated with the n-tuple values.

6. The method of claim 4, wherein said selectively sending is based on a current processing load being experienced by the host.

7. The method of claim 1, wherein said processing comprises:
determining, by the processing resource, the subsequent packet is part of a denial of service attack; and
dropping, by the processing resource, the subsequent packet.

8. The method of claim 7, wherein the denial of service attack represents a Transmission Control Protocol (TCP) SYN flood.

9. The method of claim 7, wherein the denial of service attack represents a port scan.

10. The method of claim 1, wherein said searching the CBF comprises:
calculating, by the processing resource, k hash values by applying k hash functions to the n-tuple values;
reading, by the processing resource, k memory locations corresponding to the k hash values, wherein each of the k memory locations contains one of the plurality of counters; and
evaluating, by the processing resource, whether all k memory locations contain non-zero values.

11. The method of claim 10, wherein a memory associated with the CBF is partitioned into k memory spaces and wherein each of the k hash values point to one of the k memory spaces from which the k memory locations are read.

12. A network device comprising:
a processing resource; and
a non-transitory computer-readable medium, coupled to the processing resource, having stored therein instructions that when executed by the processing resource cause the processing resource to:
maintain, a plurality of connection rate meters per one or more of destination Internet Protocol (IP) address, source IP address, and security policy;
receive a packet;
extract n-tuple values from a header of the packet that are indicative of a particular transport protocol connection with which the packet is associated;
determine whether the particular transport protocol connection represents an active transport protocol connection represented within a counting Bloom filter (CBF) by searching the CBF based on the n-tuple values, wherein the CBF includes a plurality of counters;
when the searching results in a hit, classify the packet as a subsequent packet of the active transport protocol connection; and
when the searching results in a miss:
classify the packet as a first packet of a new transport protocol connection; and
increment those counters of the plurality of counters corresponding to the n-tuple values;
when a decrement event is detected for one or more counters of the plurality of counters, decrement the one or more counters; and
process the packet in accordance with its classification as the first packet or the subsequent packet.

13. The network device of claim 12, wherein instructions further cause the processing resource to:
when said determining is negative, add a queue entry containing information indicative of those counters of the plurality of counters corresponding to the n-tuple values to a retirement queue; and
wherein the decrement event comprises the retirement queue reaching a depth threshold or a timestamp of a top queue entry of the retirement queue meeting a time threshold.

14. The network device of claim 12, wherein the packet comprises a fragmented IP packet and wherein processing of the packet comprises:
- classifying the fragmented IP packet into a sequence group of a plurality of sequence groups; and
- when the fragmented IP packet is a lead fragment of the sequence group, selectively sending the lead fragment to a host or dropping the lead fragment;
- when the fragmented IP packet is a follow-on fragment of the sequence group, selectively sending the follow-on fragment to the host or dropping the follow-on fragment based on whether the lead fragment of the sequence group was sent to the host.

15. The network device of claim 14, wherein said selectively sending is based on a policy associated with the n-tuple values.

16. The network device of claim 14, wherein said selectively sending is based on a current processing load being experienced by the host.

17. The network device of claim 12, wherein processing of the packet comprises:
- determining the subsequent packet is part of a denial of service attack; and
- dropping the subsequent packet.

18. The network device of claim 17, wherein the denial of service attack represents a Transmission Control Protocol (TCP) SYN flood.

19. The network device of claim 17, wherein the denial of service attack represents a port scan.

20. The network device of claim 12, wherein said searching the CBF comprises:
- calculating k hash values by applying k hash functions to the n-tuple values;
- reading k memory locations corresponding to the k hash values, wherein each of the k memory locations contains one of the plurality of counters; and
- evaluating whether all k memory locations contain non-zero values.

* * * * *